United States Patent
Yang et al.

(10) Patent No.: US 12,506,161 B2
(45) Date of Patent: Dec. 23, 2025

(54) METHOD AND APPARATUS FOR TRANSMITTING CURRENT AND VOLTAGE SIGNALS OF FUEL CELL BASED ON CONNECTOR

(71) Applicant: CATARC NEW ENERGY VEHICLE TEST CENTER (TIANJIN) CO., LTD., Tianjin (CN)

(72) Inventors: Zirong Yang, Tianjin (CN); Dong Hao, Tianjin (CN); Guang Ma, Tianjin (CN); Yanyi Zhang, Tianjin (CN); Xingwang Xiong, Tianjin (CN); Jianqiang Guo, Tianjin (CN); Yunpeng Yang, Tianjin (CN); Xifeng Luo, Tianjin (CN)

(73) Assignee: CATARC NEW ENERGY VEHICLE TEST CENTER (TIANJIN) CO., LTD., Tianjin (CN)

( * ) Notice: Subject to any disclaimer, the term of this patent is extended or adjusted under 35 U.S.C. 154(b) by 150 days.

(21) Appl. No.: 18/631,201

(22) Filed: Apr. 10, 2024

(65) Prior Publication Data

US 2024/0372116 A1 Nov. 7, 2024

(30) Foreign Application Priority Data

May 5, 2023 (CN) .......................... 202310494263.1

(51) Int. Cl.
*H01M 8/0202* (2016.01)
*H01M 8/04537* (2016.01)
(Continued)

(52) U.S. Cl.
CPC ..... *H01M 8/0269* (2013.01); *H01M 8/04544* (2013.01); *H01M 8/04574* (2013.01);
(Continued)

(58) Field of Classification Search
CPC .......... H01M 8/0269; H01M 8/04544; H01M 8/04574; H01M 8/1004; H05K 1/11; H05K 1/181; H05K 2201/10022
(Continued)

(56) References Cited

U.S. PATENT DOCUMENTS

| 2017/0104231 A1* | 4/2017 | Jomori | H01M 8/04582 |
| 2022/0140354 A1* | 5/2022 | Su | H01M 4/8828 |
| | | | 429/523 |
| 2024/0120510 A1* | 4/2024 | Yanai | H01M 8/023 |

FOREIGN PATENT DOCUMENTS

| CN | 111525160 A | 8/2020 |
| CN | 111540929 | 8/2020 |

(Continued)

OTHER PUBLICATIONS

First Office Action issued in Chinese Patent Application No. 202310494263.1; mailed Jun. 7, 2023; 12 pgs.
(Continued)

*Primary Examiner* — Huy Q Phan
*Assistant Examiner* — Trung Q Nguyen
(74) *Attorney, Agent, or Firm* — PORUS IP LLC (57) ABSTRACT

A printed circuit board transmits the collected current and voltage signals of different regions in a membrane electrode assembly inside the fuel cell to PCB connectors, and transmits the current and voltage signals to a data collection module by means of mating of a male of the connector, a female and a male of the standard harness. The current and voltage signals of the PCB connectors are identified, and a local current density of the fuel cell represented by each signal is positioned according to the position matching relationship, so that the current density distribution in the entire membrane electrode assembly of the fuel cell is finally obtained. According to the scheme, stable and reliable transmission of current and voltage signals of different (Continued)

regions on the membrane electrode assembly inside the fuel cell to the data collection system is realized.

7 Claims, 5 Drawing Sheets

(51) Int. Cl.
*H01M 8/1004* (2016.01)
*H05K 1/11* (2006.01)
*H05K 1/18* (2006.01)

(52) U.S. Cl.
CPC ............ *H01M 8/1004* (2013.01); *H05K 1/11* (2013.01); *H05K 1/181* (2013.01); *H05K 2201/10022* (2013.01)

(58) Field of Classification Search
USPC ....................................... 324/500, 600, 76.11
See application file for complete search history.

(56) References Cited

FOREIGN PATENT DOCUMENTS

| CN | 111987338 | | 11/2020 |
|---|---|---|---|
| CN | 113363539 | A | 9/2021 |
| CN | 113701824 | | 11/2021 |
| CN | 217085220 | U | 7/2022 |
| CN | 115084597 | A | 9/2022 |

OTHER PUBLICATIONS

Search Report issued in Chinese Patent Application No. 202310494263. 1; mailed Jun. 7, 2023; 1 pg.
Notification to Grant Patent Right for Invention in Chinese Application No. 202310494263.1 mailed on Jun. 19, 2023, 4 pages.
First Office Action in Chinese Application No. 202310494263.1 mailed on Jun. 7, 2023, 13 pages.

* cited by examiner

The printed circuit board sends the collected current signals in different regions on the membrane electrode assembly inside the fuel cell to the first PCB connector and the second PCB connector through left current signal lines and right current signal lines

↓

The printed circuit board sends the collected voltage signals in different regions on the membrane electrode assembly inside the fuel cell to the third PCB connector through voltage signal lines

↓

A female of each of the PCB connectors is connected to a male of the standard harness, and the female of the standard harness is connected to the data collection module, so as to transmit the current signals and the voltage signals to the data collection module

↓

The data collection module identifies the current signals and the voltage signals of the PCB connectors, then positions the local current density of the fuel cell represented by each signal according to the position matching relationship, and finally obtains the current density distribution in the whole fuel cell plane

METHOD AND APPARATUS FOR TRANSMITTING CURRENT AND VOLTAGE SIGNALS OF FUEL CELL BASED ON CONNECTOR

CROSS REFERENCE TO RELATED APPLICATIONS

The present application claims priority from Chinese Application Number 202310494263.1 filed May 5, 2023, the disclosure of which is hereby incorporated by reference herein in its entirety.

FIELD

The present disclosure relates to a field of fuel cell testing, and more particularly, to a method and apparatus for transmitting current and voltage signals of a fuel cell based on connector.

BACKGROUND

Printed circuit board technology has been proven to be an effective means for testing requirements for current density distribution inside fuel cells. Although some patents have been issued to the related test systems about printed circuit boards, these patents focus on the manner in which the current density is measured or calculated, without a detailed description of how the current density signal is transmitted from the fuel cell to the data collection system. In prior art 1, it discloses "current density signal, temperature signal and cell voltage signal measured by a PCB board are collected by a data collection apparatus after stable operation, and a data processing result is transmitted to a computer in claim 3". In prior art 2, it discloses "the collected signal is transmitted to respective data processing units in claim 7". In prior art 3, it discloses "the current density collection board connects the voltage signals at both ends of the sampling resistor to the signal amplification module through the wires, and the signal amplification module amplifies the voltage signals at the input terminal and then transmits the voltage signals to the signal collection module in claim 5. In addition, there are many current density distribution signal channels inside the fuel cell, and the prior art does not mention how to improve the stability of signal transmission and the integration of the signal transmission module.

However, in a solution of plug connectors in a printed circuit board, it is connected to a signal line in the form of a spring terminal, and a plug connector needs a plurality of signal lines, so that tens of hundreds of signal lines are formed on the entire printed circuit board. The signal lines need to be marked one by one, which is very confusing. Moreover, the number of plug connectors is large, and individual problems may affect the overall electrical signal collection and greatly affect the reliability of the test.

SUMMARY

According to a first aspect of the present disclosure, the present disclosures protects an apparatus for transmitting current and voltage signals of a fuel cell based on connector, comprising: PCB connectors, a printed circuit board, and a data collection module;
the data collection module being used for collecting current signals and voltage signals of different regions on a membrane electrode assembly inside the fuel cell;
the PCB connectors including a first PCB connector, a second PCB connector, and a third PCB connector;
the printed circuit board having a plurality of chip resistors thereon;
the PCB connectors having a plurality of pins thereon;
an electrical signal transmitted by a pin on the PCB connectors corresponding to a chip resistor on the printed circuit board;
the PCB connectors being soldered to the printed circuit board, and the PCB connectors being connected to the data collection module.

Further, both ends of each of the chip resistors on the printed circuit board including a left current signal line, a right current signal line, and a voltage signal line.

Further, the first PCB connector and the second PCB connector connecting the left current signal line and the right current signal line of each of the chip resistors;
the third PCB connector connecting the voltage signal line of each of the chip resistors;

Further, the first PCB connector and the second PCB connector transmit the current signals in different regions on the membrane electrode assembly inside the fuel cell;
the third PCB connector transmits the voltage signals in different regions on the membrane electrode assembly inside the fuel cell.

Further, there are a current collection array and a voltage collection array in different regions on the membrane electrode assembly inside the fuel cell;
the current collection array collects current signals in different regions on the membrane electrode assembly inside the fuel cell;
the voltage collection array collects voltage signals in different regions on the membrane electrode assembly inside the fuel cell.

Further, the PCB connectors are connected to the data collection module, and specifically comprising:
a female of each of the PCB connector is connected to a male of a standard harness, and a female of the standard harness is connected to the data collection module.

Further, the chip resistors on the printed circuit board are arranged in an array form;
signals of the pins on the first PCB connector and signals of the pins on the second PCB connector correspond to an arrangement order of current collection arrays in different regions on the membrane electrode assembly inside the fuel cell;
signals of the pins of the third PCB connector correspond to arrangement order of voltage collection arrays in different regions on the membrane electrode assembly inside the fuel cell.

Further, the PCB connectors are soldered to the printed circuit board, specifically including:
an end of each of the PCB connectors is provided with a harpoon, and the printed circuit board is provided with a through hole;
the harpoon at the end of each of the PCB connectors and the through hole on the printed circuit board are fixed by soldering.

According to a first aspect of the present disclosure, the present disclosures protects a method for transmitting current and voltage signals of a fuel cell based on connector, the method being used in the apparatus for transmitting current and voltage signals of a fuel cell based on connector, comprising:
the printed circuit board sends the collected current signals in different regions on the membrane electrode assembly inside the fuel cell to the first PCB connector and the second PCB connector through left current signal lines and right current signal lines;

the printed circuit board sends the collected voltage signals in different regions on the membrane electrode assembly inside the fuel cell to the third PCB connector through voltage signal lines;

a female of each of the PCB connectors is connected to a male of the standard harness, and a female of the standard harness is connected to the data collection module, so as to transmit the current signals and the voltage signals to the data collection module;

the data collection module identifies the current signals and the voltage signals of the PCB connectors, then positions a local current density of the fuel cell represented by each signal according to a position matching relationship, and finally obtains a current density distribution in a whole fuel cell membrane electrode assembly.

The present disclosure protects a method and apparatus for transmitting current and voltage signals of a fuel cell based on connector. A printed circuit board transmits the collected current and voltage signals of different regions on a membrane electrode assembly inside the fuel cell to PCB connectors, and transmits the current and voltage signals to a data collection module by means of mating of a male of the connector, a female and a male of the standard harness. The current and voltage signals of the PCB connectors are identified, and a local current density of the fuel cell represented by each signal is positioned according to the position matching relationship, so that the current density distribution in the entire plane of the fuel cell is finally obtained. According to the scheme, stable and reliable transmission of current and voltage signals of different regions on the membrane electrode assembly inside the fuel cell to the data collection system is realized, the plugging and unplugging of the connector does not affect the reliability of overall electric signal collection, the risk of a failure of local signal collection does not exist, and it is very stable.

DETAILED DESCRIPTION

Exemplary embodiments of the present disclosure will be described in more detail below with reference to the accompanying drawings. It is to be understood that the terms "first", "second", and the like, as used herein, may be used in this context to describe various elements, but these elements are not limited to these terms unless specifically stated otherwise. These terms are used only to distinguish the first element from the other element. While exemplary embodiments of the present disclosure are shown in the drawings, it is to be understood that the disclosure may be implemented in various forms and should not be limited to the embodiments set forth herein. Rather, these embodiments are provided to enable a more thorough understanding of the present disclosure and to convey the scope of the disclosure to those skilled in the art as a whole.

Figure 1:
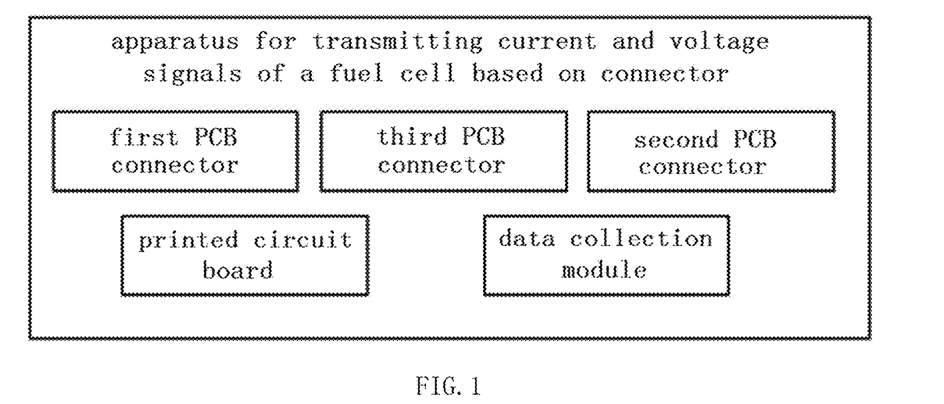
FIG. 1 is a block diagram of a structure of an apparatus for transmitting current and voltage signals of a fuel cell based on connector according to the present disclosure.

According to a first embodiment of the present disclosure, referring to FIG. 1, the present disclosure seeks to protect an apparatus for transmitting current and voltage signals of a fuel cell based on connector comprising PCB connectors, a printed circuit board, and a data collection module.

It collects current signals and voltage signals of different regions on a membrane electrode assembly inside the fuel cell.

The PCB connectors include a first PCB connector, a second PCB connector, and a third PCB connector.

The printed circuit board has a plurality of chip resistors thereon.

The PCB connectors have a plurality of pins thereon.

The electrical signals transmitted by the pins on the PCB connectors correspond to respective chip resistances on the printed circuit board.

The PCB connectors are soldered to the printed circuit board, and the PCB connectors are connected to the data collection module.

Further, both ends of each of the chip resistors on the printed circuit board include a left current signal line, a right current signal line, and a voltage signal line.

Further, the first PCB connector and the second PCB connector connect the left current signal line and the right current signal line of each of the chip resistors.

The third PCB connector connects the voltage signal line of each of the chip resistors.

In this embodiment, each of the pins on the PCB connectors corresponds to an electrical signal on the printed circuit board, and the arrangement sequence of the pins corresponds to the position of the electrical signal corresponding to the chip resistance on the printed circuit board.

Figure 2:
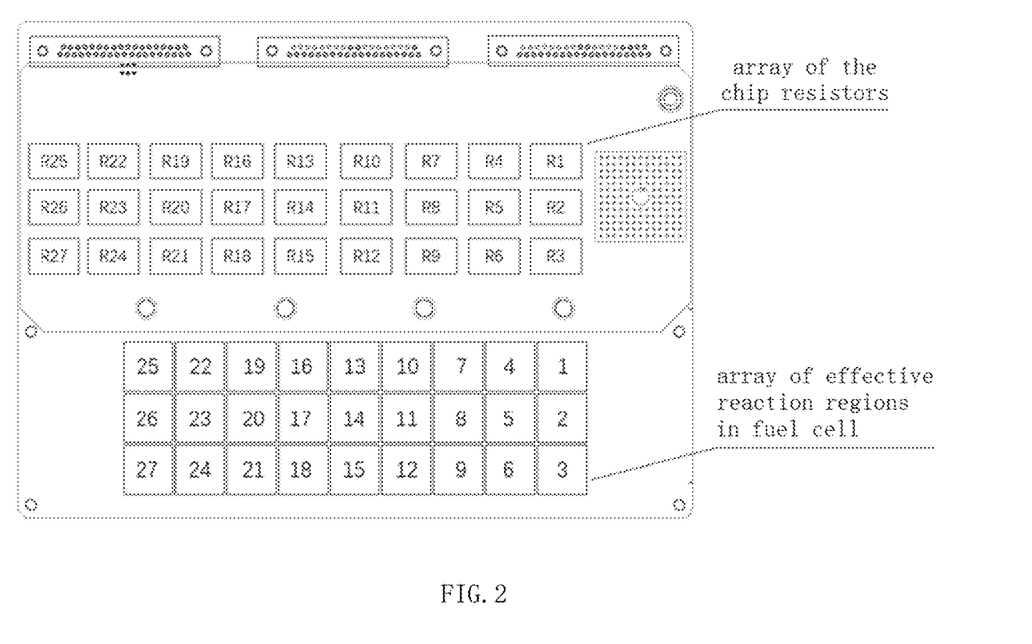
FIG. 2 is a schematic diagram of a printed circuit board of an apparatus for transmitting current and voltage signals of a fuel cell based on connector according to the present disclosure.

Further, referring to FIG. 2, the first PCB connector and the second PCB connector transmit current signals in different regions on the membrane electrode assembly inside the fuel cell.

The third PCB connector transmits voltage signals in different regions on the membrane electrode assembly inside the fuel cell.

There are a current collection array and a voltage collection array in different regions on the membrane electrode assembly inside the fuel cell.

The chip resistors are arranged in an array.

The current collection array collects current signals in different regions on the membrane electrode assembly inside the fuel cell.

The voltage collection array collects voltage signals in different regions on the membrane electrode assembly inside the fuel cell.

Here, in this embodiment, all local current signals and local voltage signals in different regions on the membrane electrode assembly inside the fuel cell are first transmitted to the PCB connectors through the inner wiring of the printed circuit board, and then further transmitted to the data collection module through the standard harness by mating with the male and female of the PCB connector.

Figure 3:
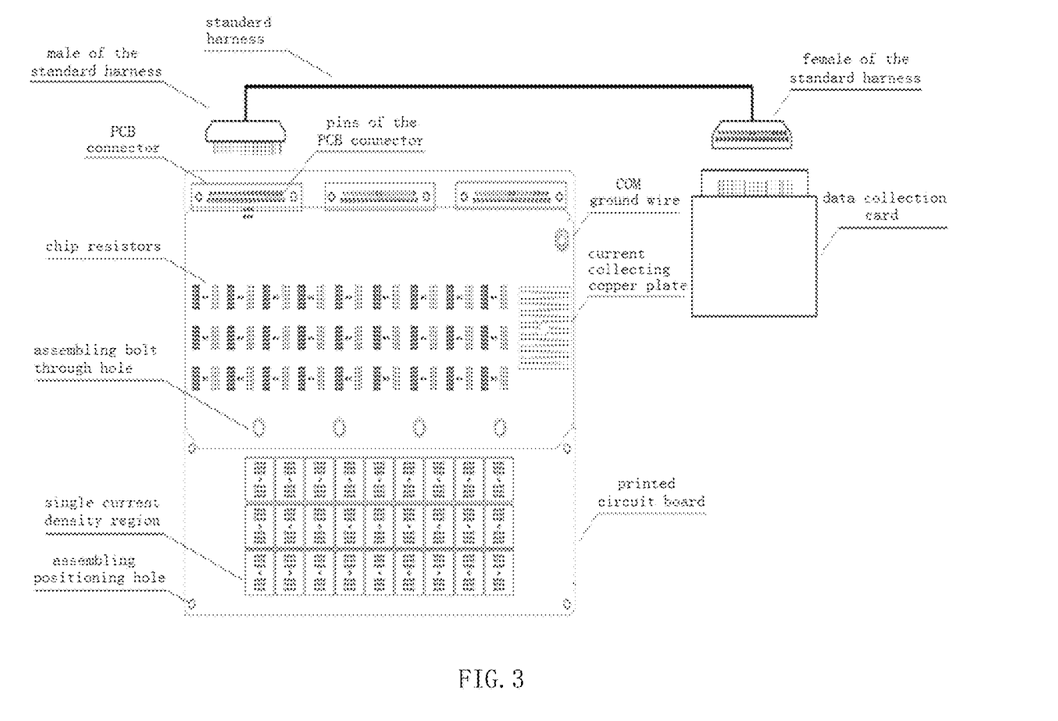
FIG. 3 is a model structure diagram of an apparatus for transmitting current and voltage signals of a fuel cell based on connector according to the present disclosure.

Further, the PCB connectors are connected to the data collection module, and specifically includes:

Referring to FIG. 3, a female of each of the PCB connectors is connected to a male of the standard harness, and a female of the standard harness is connected to the data collection module.

The data collection module is realized by a data collection card, and the data collection card is connected to the female of the standard harness.

A female of each of the PCB connectors is connected to a male of the standard harness, and the pins on the PCB connectors are connected to signal lines of the chip resistors.

The printed circuit board is provided with an assembling bolt through hole, a current collecting copper plate, and an assembling positioning hole for fixing the printed circuit board.

A single current density region on the printed circuit board is used to collect current signals for that region.

Figure 4:
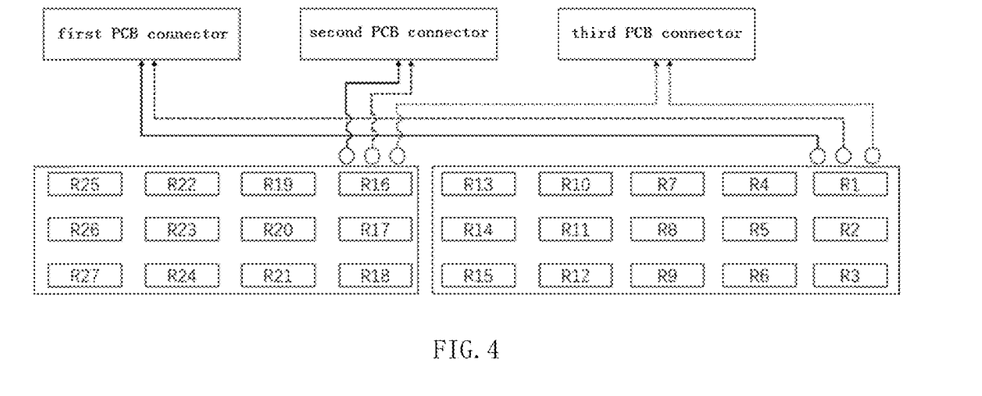
FIG. 4 is a schematic view of overall connection of chip resistors and connectors in an apparatus for transmitting current and voltage signals of a fuel cell based on connector according to the present disclosure.

Further, referring to FIG. 4, the chip resistors on the printed circuit board are arranged in the form of an array.

The signals of the pins on the first PCB connector and the signals of pins on the second PCB connector correspond to arrangement order of the current collection arrays in different regions on the membrane electrode assembly inside the fuel cell.

Signals of the pins on the third PCB connector correspond to arrangement order of voltage collection arrays in different regions on the membrane electrode assembly inside the fuel cell.

In this embodiment, there are 27 chip resistors on the printed circuit board.

Numbers of 27 chip resistors on the printed circuit board are R1, R2, R3, . . . . R26, R27.

The left current signal lines and the right current signal lines of respective R1-R15 are connected to the first PCB connector.

The left current signal lines and the right current signal lines of respective R16-R27 are connected to the second PCB connector.

The voltage signal lines of respective R1-R27 are connected to the third PCB connector.

Figure 5:
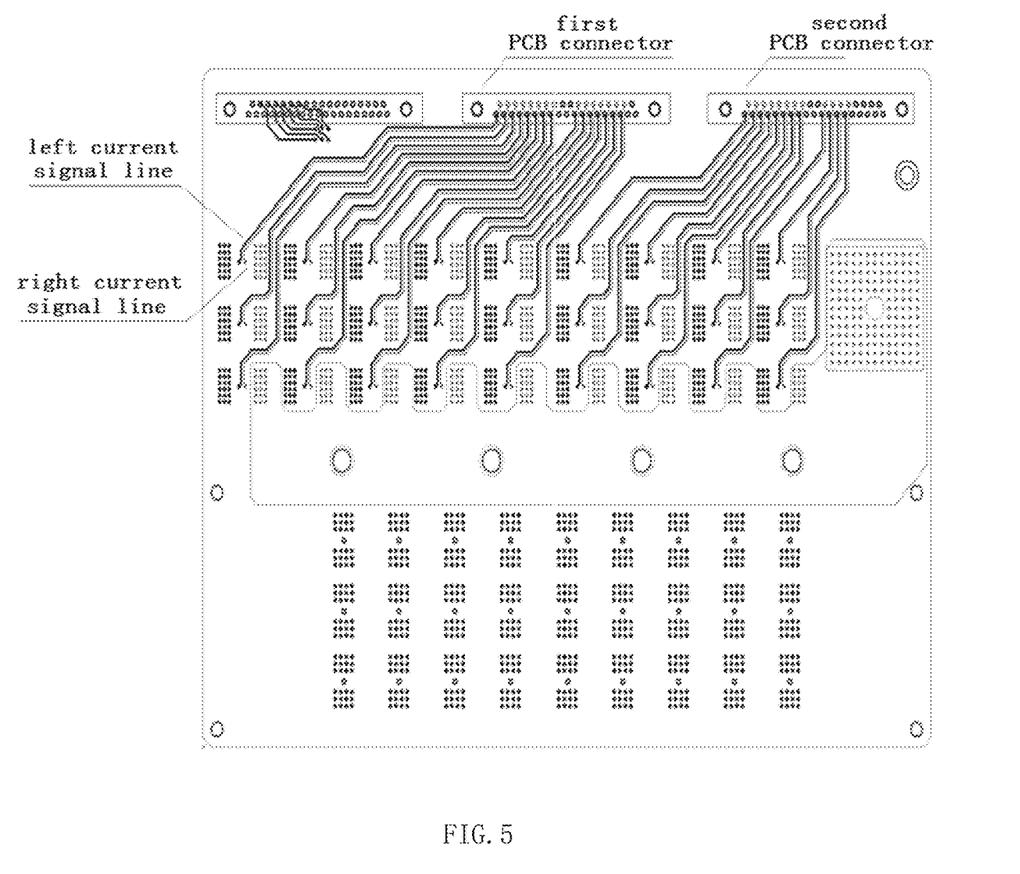
FIGS. 5 to 6 are schematic views of internal connection of chip resistors and connectors in an apparatus for transmitting current and voltage signals of a fuel cell based on connector according to the present disclosure.
Figure 6:
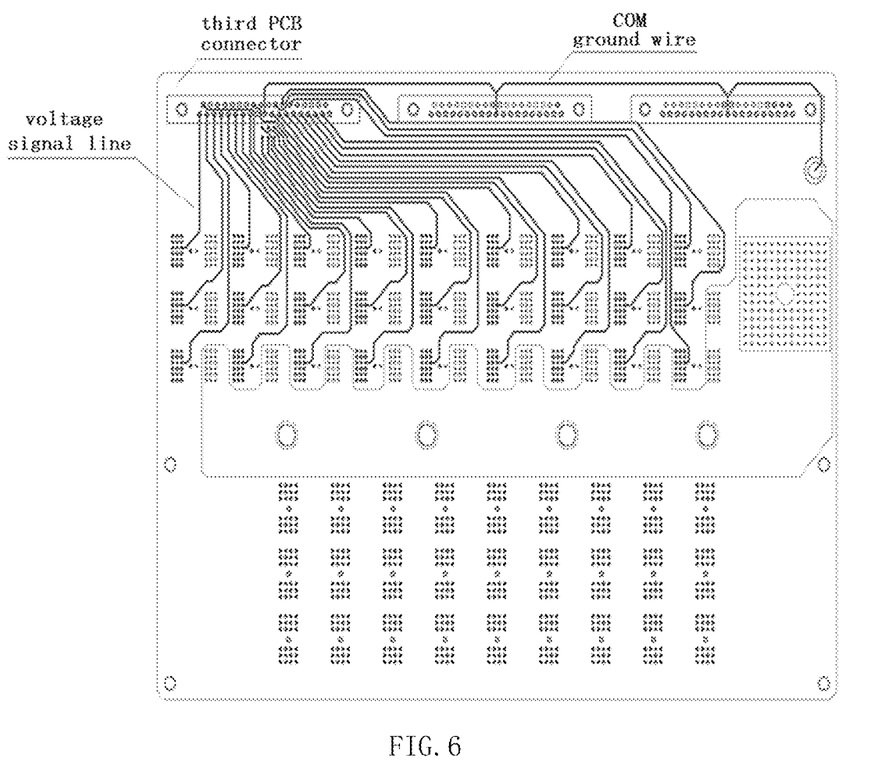

Referring to FIGS. 5-6, the chip resistors on the printed circuit board are arranged in a matrix of three rows and nine columns.

Specifically, R25-R27 are located in the first column and R22-R24 are located in the second column, R19-R21 are located in the third column, R16-R18 are located in the fourth column, R13-R15 are located in the fifth column, R10-R12 are located in the sixth column, R7-R9 are located in the seventh column, R4-R6 are located in the eighth column, and R1-R3 are located in the ninth column.

The ground wire of each of the PCB connectors does not need to be connected to the chip resistors, and the COM ground wire of each of the PCB connector is located above the current collecting copper board.

Further, the PCB connectors are soldered to the printed circuit board, specifically including:

The end of each of the PCB connectors is provided with a harpoon, and the printed circuit board is provided with a through hole.

The harpoon at the end of each of the PCB connectors and the through-hole on the printed circuit board are fixed by soldering.

Figure 7:
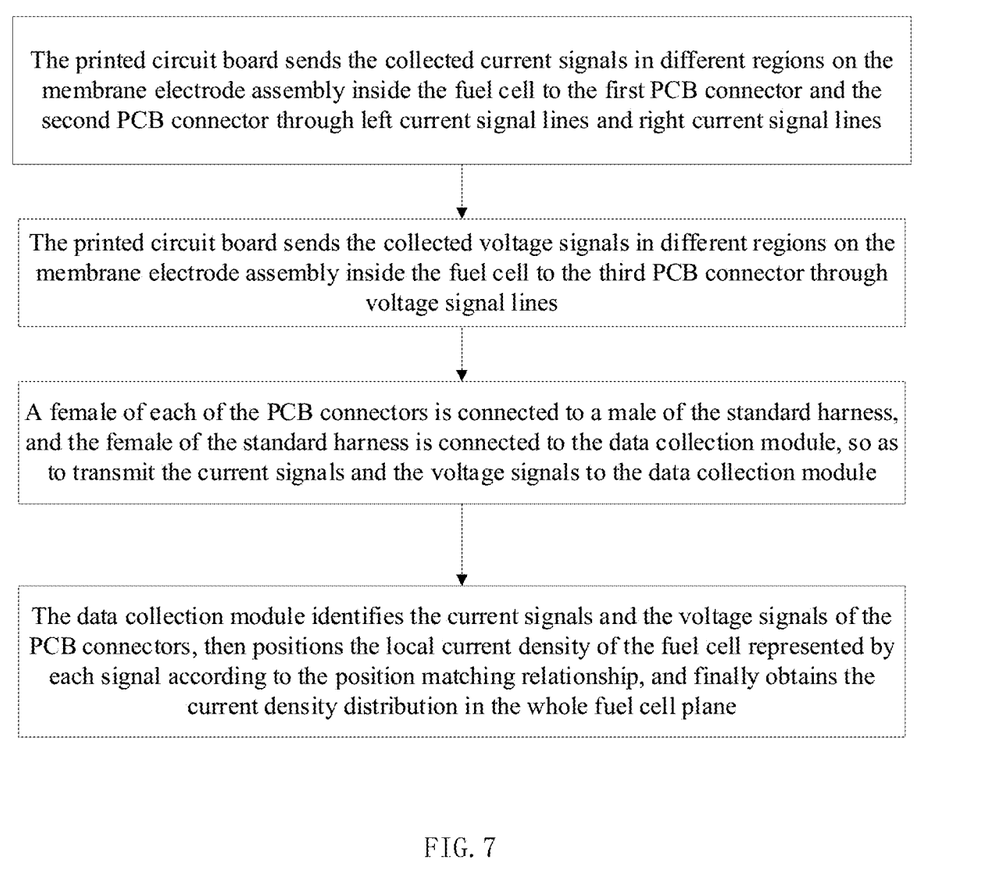
FIG. 7 is a flow chart of a method for transmitting current and voltage signals of a fuel cell based on connector according to the present disclosure.

According to a second embodiment of the present disclosure, referring to FIG. 7, the present disclosure seeks to protect a method for transmitting current and voltage signals of a fuel cell based on connector, the method is used in an apparatus for transmitting current and voltage signals of fuel cell based on connector. The method comprises:

The printed circuit board sends the collected current signals in different regions on the membrane electrode assembly inside the fuel cell to the first PCB connector and the second PCB connector through left current signal lines and right current signal lines.

The printed circuit board sends the collected voltage signals in different regions on the membrane electrode assembly inside the fuel cell to the third PCB connector through voltage signal lines.

A female of each of the PCB connectors is connected to a male of the standard harness, and the female of the standard harness is connected to the data collection module, so as to transmit the current signals and the voltage signals to the data collection module.

The data collection module identifies the current signals and the voltage signals of the PCB connectors, then positions the local current density of the fuel cell represented by each signal according to the position matching relationship, and finally obtains the current density distribution in the whole fuel cell plane.

Here, in this embodiment, the membrane electrode assembly inside the fuel cell is divided into a plurality of effective reaction regions, and the current densities at different positions in the effective reaction regions are calculated as follows:

$$\begin{cases} I_1 = \dfrac{V_1^{left} - V_1^{right}}{R_1 A_1} \\ I_2 = \dfrac{V_2^{left} - V_2^{right}}{R_2 A_2} \\ \quad \ldots \\ I_n = \dfrac{V_n^{left} - V_n^{right}}{R_n A_n} \end{cases}$$

$I_1$ represents the current density (A cm$^{-2}$) of the effective reaction region 1 of the fuel cell, $V_1^{left}$ represents the value (V) of the left current signal line of the chip resistor 1, $V_1^{right}$ represents the value (V) of the right current signal line of the chip resistor 1, $R_1$ represents the resistance value ($\Omega$) of the chip resistor 1, and $A_1$ represents the area (cm$^{-2}$) of the effective reaction region 1 of the fuel cell.

$I_2$ represents the current density (A cm$^{-2}$) of the effective reaction region 2 of the fuel cell, $V_2^{left}$ represents the value (V) of the left current signal line of the chip resistor 2, $V_2^{right}$ represents the value (V) of the right current signal line of the chip resistor 2, $R_2$ represents the resistance value ($\Omega$) of the chip resistor 2, and $A_2$ represents the area (cm$^{-2}$) of the effective reaction region 2 of the fuel cell.

$I_n$ represents the current density (A cm$^{-2}$) of the effective reaction region n of the fuel cell, $V_n^{left}$ represents the value (V) of the left current signal line of the chip resistor n, $V_n^{right}$ represents the value (V) of the right current signal line of the chip resistor n, $R_n$ represents the resistance value ($\Omega$) of the chip resistor n, and $A_n$ represents the area (cm$^{-2}$) of the effective reaction region n of the fuel cell.

$$\begin{cases} V_1 = V_1^{voltage} \\ V_2 = V_2^{voltage} \\ \quad \ldots \\ V_n = V_n^{voltage} \end{cases}$$

$V_1$ represents a voltage (V) of the effective reaction region 1 of the fuel cell, $V_1^{voltage}$ represents a value (V) of the voltage signal line of the chip resistor 1, $V_2$ represents a voltage (V) of the effective reaction region 2 of the fuel cell, $V_2^{voltage}$ represents a value (V) of the voltage signal line of the chip resistor 2, $V_n$ represents a voltage (V) of the effective reaction region n of the fuel cell, and $V_n^{voltage}$ represents a value (V) of the voltage signal line of the chip resistor n.

The distribution array of current densities in the effective reaction regions on the membrane electrode assembly of the fuel cell is as follows:

$$I_{map} = \begin{bmatrix} I_{25} & I_{22} & I_{19} & I_{16} & I_{13} & I_{10} & I_7 & I_4 & I_1 \\ I_{26} & I_{23} & I_{20} & I_{17} & I_{14} & I_{11} & I_8 & I_5 & I_2 \\ I_{27} & I_{24} & I_{21} & I_{18} & I_{15} & I_{12} & I_9 & I_6 & I_3 \end{bmatrix}$$

$I_{map}$ represents the distribution array of current densities in the effective reaction regions of the fuel cell, and $I_1$ to $I_{27}$ respectively represent the current density (A cm$^{-2}$) of the effective reaction region 1 to the effective reaction region 27 of the fuel cell.

The distribution array of voltages in the effective reaction regions of the fuel cell is as follows:

$$V_{map} = \begin{bmatrix} V_{25} & V_{22} & V_{19} & V_{16} & V_{13} & V_{10} & V_7 & V_4 & V_1 \\ V_{26} & V_{23} & V_{20} & V_{17} & V_{14} & V_{11} & V_8 & V_5 & V_2 \\ V_{27} & V_{24} & V_{21} & V_{18} & V_{15} & V_{12} & V_9 & V_6 & V_3 \end{bmatrix}$$

$V_{map}$ represents the distribution array of voltages in the effective reaction regions of the fuel cell, and $V_1$ to $V_{27}$ respectively represent voltages (V) of the effective reaction region 1 to the effective reaction region 27 of the fuel cell.

A mapping relationship between the left current signal lines, the right current signal lines, and the voltage signal lines of the chip resistor 1 to the chip resistor 27 and the signals of the pins on the PCB connectors is:

A first PCB connector:

$$\begin{cases} V_1^{left} = V_{PCB1}^{P1}, V_1^{right} = V_{PCB1}^{P20} \\ V_2^{left} = V_{PCB1}^{P2}, V_2^{right} = V_{PCB1}^{P21} \\ \quad \ldots \\ V_{14}^{left} = V_{PCB1}^{P16}, V_{14}^{right} = V_{PCB1}^{P35} \\ V_{15}^{left} = V_{PCB1}^{P17}, V_{15}^{right} = V_{PCB1}^{P36} \end{cases}$$

$V_1^{left}$ represents a value (V) of a left current signal line of the chip resistor 1, $V_1^{right}$ represents a value (V) of a right current signal line of the chip resistor 1, $V_{PCB1}^{P1}$ represents an electric signal value (V) corresponding to the pin 1 in the first PCB connector, and $V_{PCB1}^{P20}$ represents an electric signal value (V) corresponding to the pin 20 in the first PCB connector, $V_2^{left}$ represents a value (V) of a left current signal line of the chip resistor 2, $V_2^{right}$ represents a value (V) of a right current signal line of the chip resistor 2, $V_{PCB1}^{P2}$ represents an electric signal value (V) corresponding to the pin 2 in the first PCB connector, and $V_{PCB1}^{P21}$ represents an electric signal value (V) corresponding to the pin 21 in the first PCB connector, $V_{14}^{left}$ represents a value (V) of a left current signal line of the chip resistor 14, $V_{14}^{right}$ represents a value (V) of a right current signal line of the chip resistor 14, $V_{PCB1}^{P16}$ represents an electric signal value (V) corresponding to the pin 16 in the first PCB connector, and $V_{PCB1}^{P35}$ represents an electric signal value (V) corresponding to the pin 35 in the first PCB connector, $V_{15}^{left}$ represents a value (V) of the left current signal line of the chip resistor 15, $V_{15}^{right}$ represents a value (V) of the right current signal line of the chip resistor 15, $V_{PCB1}^{P17}$ represents a value (V) of the electrical signal corresponding to the pin 17 in the first PCB connector, and $V_{PCB1}^{P36}$ represents a value (V) of the electrical signal corresponding to the pin 36 in the first PCB connector.

A second PCB connector:

$$\begin{cases} V_{16}^{left} = V_{PCB2}^{P1}, V_{16}^{right} = V_{PCB2}^{P20} \\ V_{17}^{left} = V_{PCB2}^{P2}, V_{17}^{right} = V_{PCB2}^{P21} \\ \quad \ldots \\ V_{26}^{left} = V_{PCB2}^{P13}, V_{26}^{right} = V_{PCB2}^{P32} \\ V_{27}^{left} = V_{PCB2}^{P14}, V_{27}^{right} = V_{PCB2}^{P33} \end{cases}$$

$V_{16}^{left}$ represents a value (V) of a left current signal line of the chip resistor 16, $V_{16}^{right}$ represents a value (V) of a right current signal line of the chip resistor 16, $V_{PCB2}^{P1}$ represents an electric signal value (V) corresponding to the pin 1 in the second PCB connector, $V_{PCB2}^{P20}$ represents an electric signal value (V) corresponding to the pin 20 in the second PCB connector, $V_{17}^{left}$ represents a value (V) of a left current signal line of the chip resistor 17, $V_{17}^{right}$ represents a value (V) of a right current signal line of the chip resistor 17, $V_{PCB2}^{P2}$ represents an electric signal value (V) corresponding to the pin 2 in the second PCB connector, and $V_{PCB2}^{P21}$ represents an electric signal value (V) corresponding to the pin 21 in the second PCB connector, $V_{26}^{left}$ represents a value (V) of a left current signal line of the chip resistor 26, $V_{26}^{right}$ represents a value (V) of a right current signal line of the chip resistor 26, $V_{PCB2}^{P13}$ represents an electric signal value (V) corresponding to the pin 13 in the second PCB connector, $V_{PCB2}^{P32}$ represents an electric signal value (V) corresponding to the pin 32 in the second PCB connector, $V_{27}^{left}$ represents a value (V) of the left current signal line of a chip resistor 27, $V_{27}^{right}$ represents a value (V) of the right current signal line of the chip resistor 27, $V_{PCB2}^{P14}$ represents a value (V) of the electrical signal corresponding to a pin 14 in the second PCB connector, and $V_{PCB2}^{P33}$ represents a value (V) of an electrical signal corresponding to a pin 33 in the second PCB connector.

A third PCB connector:

$$\begin{cases} V_1^{voltage} = V_{PCB3}^{P1} \\ V_2^{voltage} = V_{PCB3}^{P2} \\ \quad \ldots \\ V_{26}^{voltage} = V_{PCB3}^{P31} \\ V_{27}^{voltage} = V_{PCB3}^{P32} \end{cases}$$

$V_1^{voltage}$ represents a value (V) of a voltage signal line of the chip resistor 1, $V_{PCB3}^{P1}$ represents an electric signal value (V) corresponding to the pin 1 in the third PCB connector, $V_2^{voltage}$ represents a value (V) of a voltage signal line of the chip resistor 2, $V_{PCB3}^{P2}$ represents an electric signal value (V) corresponding to the pin 2 in the third PCB connector, $V_{26}^{voltage}$ represents a value (V) of a voltage signal line of the chip resistor 26, $V_{PCB3}^{P31}$ represents an electric signal value (V) corresponding to the pin 31 in the third PCB connector, $V_{27}^{voltage}$ represents a value (V) of a voltage signal line of the chip resistor 27, and $V_{PCB3}^{P32}$ represents an electric signal value (V) corresponding to the pin 32 in the third PCB connector.

Figure 8:
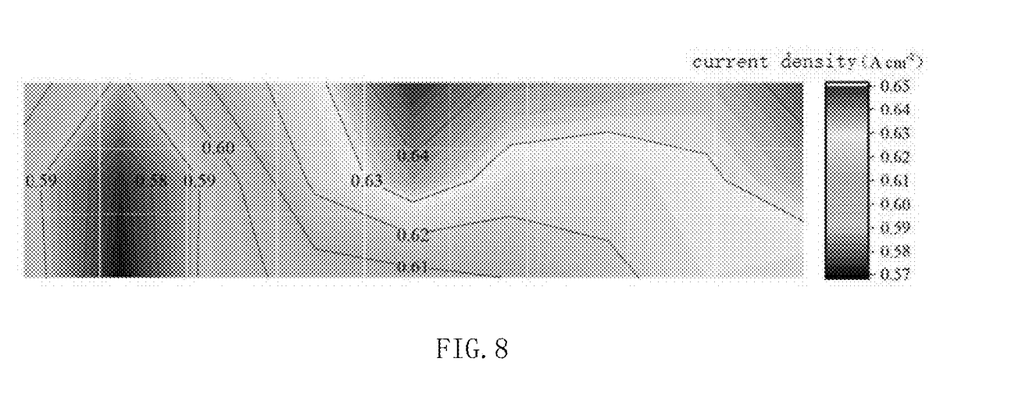
FIG. 8 is a view of current density distribution of a method for transmitting current and voltage signals of a fuel cell based on connector according to the present disclosure.

Referring to FIG. 8, an analysis of the current density results is performed on a fuel cell used in an experiment according to the above method.

In this figure, the grid-shaped current density results including 3 rows and 9 columns correspond to different regions on the membrane electrode assembly inside the fuel cell. The current density values, i.e., 27 current density values, of each of the 27 grid-shaped regions are actually tested, and then plotted by linear interpolation method using plotting software to obtain the results in FIG. 8. The current density results of respective regions are obtained by the current and voltage correspondence method described above.

It will be appreciated by those skilled in the art that various modifications and improvements may occur to the disclosure. For example, the various devices or components described above may be implemented by hardware, by software, by firmware, or by a combination of some or all of the three.

A flowchart is used in the present disclosure to illustrate the steps of a method according to an embodiment of the present disclosure. It is to be understood that the preceding or following steps do not necessarily proceed exactly in order. Instead, the various steps may be processed in reverse order or simultaneously. At the same time, other operations may also be added to these processes.

It will be appreciated by those skilled in the art that all or a portion of the steps of the above-described methods may be performed by a computer program instructing relevant hardware, the program may be stored in a computer-readable storage medium, such as a read-only memory, a magnetic disk, an optical disk, or the like. Alternatively, all or part of the steps of the above embodiments may be implemented using one or more integrated circuits. Accordingly, the modules/units in the above embodiments may be implemented in the form of hardware or in the form of software functional modules. The present disclosure is not limited to any particular form of hardware and software combination.

Unless defined otherwise, all terms used herein have the same meaning as commonly understood by one of ordinary skill in the art to which this disclosure belongs. It is also to be understood that terms such as those defined in a general dictionary should be interpreted to have a meaning consistent with their meaning in the context of the related art, without applying an idealized or extremely formal meaning unless explicitly so defined herein.

The foregoing is illustrative of the present disclosure and should not be considered as limiting. While several exemplary embodiments of the present disclosure have been described, those skilled in the art will readily appreciate that many modifications may be made to the exemplary embodiments without departing from the novel teachings and advantages of the present disclosure. Accordingly, all such modifications are intended to be included within the scope of the present disclosure as defined by the appended claims. It is to be understood that the foregoing is illustrative of the present disclosure and should not be considered as limiting to the particular embodiments disclosed, and that modifications to the disclosed and other embodiments are intended to be included within the scope of the appended claims. This disclosure is defined by the claims and their equivalents.

In the description of this specification, reference to the term "one embodiment", "some embodiments", "illustrative embodiments", "examples", "specific examples", or "some examples", etc. means that a particular feature, structure, material, or characteristic described in connection with the embodiment or example, is included in at least one embodiment or example of the present disclosure. In the present specification, the schematic representation of the above terms does not necessarily refer to the same embodiments or examples. Moreover, the specific features, structures, materials, or features described may be combined in any one or more embodiments or examples in a suitable manner.

While embodiments of the present disclosure have been shown and described, it will be understood by those skilled in the art that various changes, modifications, substitutions and variations may be made to these embodiments without departing from the principles and spirit of the disclosure, the scope of which is defined by the claims and their equivalents.

We claim:

1. An apparatus for transmitting current and voltage signals of a fuel cell based on connector, comprising: PCB connectors, a printed circuit board, and a data collection module;

the data collection module being used for collecting current signals and voltage signals of different regions on a membrane electrode assembly inside the fuel cell;

the PCB connectors including a first PCB connector, a second PCB connector, and a third PCB connector;

the printed circuit board having a plurality of chip resistors thereon;

the PCB connectors having a plurality of pins thereon;

an electrical signal transmitted by a pin on the PCB connectors corresponding to a chip resistor on the printed circuit board;

the PCB connectors being soldered to the printed circuit board, and the PCB connectors being connected to the data collection module;

both ends of each of the chip resistors on the printed circuit board including a left current signal line, a right current signal line, and a voltage signal line;

the first PCB connector and the second PCB connector connecting the left current signal line and the right current signal line of each of the chip resistors;

the third PCB connector connecting the voltage signal line of each of the chip resistors;

an membrane electrode assembly inside the fuel cell being divided into a plurality of effective reaction regions, and current densities at different positions in the effective reaction regions are calculated as follows:

$$\begin{cases} I_1 = \dfrac{V_1^{left} - V_1^{right}}{R_1 A_1} \\ I_2 = \dfrac{V_2^{left} - V_2^{right}}{R_2 A_2} \\ \quad \cdots \\ I_n = \dfrac{V_n^{left} - V_n^{right}}{R_n A_n} \end{cases};$$

$I_1$ represents a current density (A cm$^{-2}$) of an effective reaction region 1 of the fuel cell, $V_1^{left}$ represents a value (V) of the left current signal line of a chip resistor 1, $V_1^{right}$ represents a value (V) of the right current signal line of the chip resistor 1, $R_1$ represents a resistance value ($\Omega$) of the chip resistor 1, and $A_1$ represents an area (cm$^{-2}$) of the effective reaction region 1 of the fuel cell;

$I_2$ represents a current density (A cm$^{-2}$) of an effective reaction region 2 of the fuel cell, $V_2^{left}$ represents a value (V) of the left current signal line of a chip resistor 2, $V_2^{right}$ represents a value (V) of the right current signal line of the chip resistor 2, $R_2$ represents a resistance value (Ω) of the chip resistor 2, and $A_2$ represents an area (cm$^{-2}$) of the effective reaction region 2 of the fuel cell;

$I_n$ represents a current density (A cm$^{-2}$) of an effective reaction region n of the fuel cell, $V_n^{left}$ represents a value (V) of the left current signal line of a chip resistor n, $V_n^{right}$ represents a value (V) of the right current signal line of the chip resistor n, $R_n$ represents a resistance value (Ω) of the chip resistor n, and $A_n$ represents an area (cm$^{-2}$) of the effective reaction region n of the fuel cell;

$$\begin{cases} V_1 = V_1^{voltage} \\ V_2 = V_2^{voltage} \\ \ldots \\ V_n = V_n^{voltage} \end{cases};$$

$V_1$ represents a voltage (V) of the effective reaction region 1 of the fuel cell, $V_1^{voltage}$ represents a value (V) of the voltage signal line of the chip resistor 1, $V_2$ represents a voltage (V) of the effective reaction region 2 of the fuel cell, $V_2^{voltage}$ represents a value (V) of the voltage signal line of the chip resistor 2, $V_n$ represents a voltage (V) of the effective reaction region n of the fuel cell, and $V_n^{voltage}$ represents a value (V) of the voltage signal line of the chip resistor n;

an distribution array of current densities in the effective reaction regions on the membrane electrode assembly inside the fuel cell is as follows:

$$I_{map} = \begin{bmatrix} I_{25} & I_{22} & I_{19} & I_{16} & I_{13} & I_{10} & I_7 & I_4 & I_1 \\ I_{26} & I_{23} & I_{20} & I_{17} & I_{14} & I_{11} & I_8 & I_5 & I_2 \\ I_{27} & I_{24} & I_{21} & I_{18} & I_{15} & I_{12} & I_9 & I_6 & I_3 \end{bmatrix};$$

$I_{map}$ represents the distribution array of current densities in the effective reaction regions of the fuel cell, and $I_1$ to $I_{27}$ respectively represent the current density (A cm$^{-2}$) of the effective reaction region 1 to the effective reaction region 27 of the fuel cell;

an distribution array of voltages in the effective reaction regions of the fuel cell is as follows:

$$V_{map} = \begin{bmatrix} V_{25} & V_{22} & V_{19} & V_{16} & V_{13} & V_{10} & V_7 & V_4 & V_1 \\ V_{26} & V_{23} & V_{20} & V_{17} & V_{14} & V_{11} & V_8 & V_5 & V_2 \\ V_{27} & V_{24} & V_{21} & V_{18} & V_{15} & V_{12} & V_9 & V_6 & V_3 \end{bmatrix};$$

$V_{map}$ represents the distribution array of voltages in the effective reaction regions of the fuel cell, and $V_1$ to $V_{27}$ respectively represent voltages (V) of the effective reaction region 1 to the effective reaction region 27 of the fuel cell;

a mapping relationship between the left current signal lines, the right current signal lines, and the voltage signal lines of the chip resistor 1 to the chip resistor 27 and the signals of the pins on the PCB connectors is:

the first PCB connector:

$$\begin{cases} V_1^{left} = V_{PCB1}^{P1}, V_1^{right} = V_{PCB1}^{P20} \\ V_2^{left} = V_{PCB1}^{P2}, V_2^{right} = V_{PCB1}^{P21} \\ \ldots \\ V_{14}^{left} = V_{PCB1}^{P16}, V_{14}^{right} = V_{PCB1}^{P35} \\ V_{15}^{left} = V_{PCB1}^{P17}, V_{15}^{right} = V_{PCB1}^{P36} \end{cases};$$

$V_1^{left}$ represents a value (V) of a left current signal line of the chip resistor 1, $V_1^{right}$ represents a value (V) of a right current signal line of the chip resistor 1, $V_{PCB1}^{P1}$ represents an electric signal value (V) corresponding to the pin 1 in the first PCB connector, and $V_{PCB1}^{P20}$ represents an electric signal value (V) corresponding to the pin 20 in the first PCB connector, $V_2^{left}$ represents a value (V) of a left current signal line of the chip resistor 2, $V_2^{right}$ represents a value (V) of a right current signal line of the chip resistor 2, $V_{PCB1}^{P2}$ represents an electric signal value (V) corresponding to the pin 2 in the first PCB connector, and $V_{PCB1}^{P21}$ represents an electric signal value (V) corresponding to the pin 21 in the first PCB connector, $V_{14}^{left}$ represents a value (V) of a left current signal line of the chip resistor 14, $V_{14}^{right}$ represents a value (V) of a right current signal line of the chip resistor 14, $V_{PCB1}^{P16}$ represents an electric signal value (V) corresponding to the pin 16 in the first PCB connector, and $V_{PCB1}^{P35}$ represents an electric signal value (V) corresponding to the pin 35 in the first PCB connector, $V_{15}^{left}$ represents a value (V) of the left current signal line of the chip resistor 15, $V_{15}^{right}$ represents a value (V) of the right current signal line of the chip resistor 15, $V_{PCB1}^{P17}$ represents a value (V) of the electrical signal corresponding to the pin 17 in the first PCB connector, and $V_{PCB1}^{P36}$ represents a value (V) of the electrical signal corresponding to the pin 36 in the first PCB connector;

the second PCB connector:

$$\begin{cases} V_{16}^{left} = V_{PCB2}^{P1}, V_{16}^{right} = V_{PCB2}^{P20} \\ V_{17}^{left} = V_{PCB2}^{P2}, V_{17}^{right} = V_{PCB2}^{P21} \\ \ldots \\ V_{26}^{left} = V_{PCB2}^{P13}, V_{26}^{right} = V_{PCB2}^{P32} \\ V_{27}^{left} = V_{PCB2}^{P14}, V_{27}^{right} = V_{PCB2}^{P33} \end{cases};$$

$V_{16}^{left}$ represents a value (V) of a left current signal line of the chip resistor 16, $V_{16}^{right}$ represents a value (V) of a right current signal line of the chip resistor 16, $V_{PCB2}^{P1}$ represents an electric signal value (V) corresponding to the pin 1 in the second PCB connector, $V_{PCB2}^{P20}$ represents an electric signal value (V) corresponding to the pin 20 in the second PCB connector, $V_{17}^{left}$ represents a value (V) of a left current signal line of the chip resistor 17, $V_{17}^{right}$ represents a value (V) of a right current signal line of the chip resistor 17, $V_{PCB2}^{P2}$ represents an electric signal value (V) corresponding to the pin 2 in the second PCB connector, and $V_{PCB2}^{P21}$ represents an electric signal value (V) corresponding to the pin 21 in the second PCB connector, $V_{26}^{left}$ represents a value (V) of a left current signal line of the chip resistor 26, $V_{26}^{right}$ represents a value (V) of a right current signal line of the chip resistor 26, $V_{PCB2}^{P13}$ represents an electric signal value (V) corresponding to the pin 13 in the second PCB connector, $V_{PCB2}^{P32}$ represents an electric signal value (V) corresponding to the pin 32 in the second PCB connector, $V_{27}^{left}$ represents a value (V) of the left current signal line of a chip resistor 27, $V_{27}^{right}$ represents a value (V) of the right current signal line of the chip resistor 27, $V_{PCB2}^{P14}$ represents a value (V) of the electrical signal corresponding to a pin 14 in the second PCB connector, and $V_{PCB2}^{P33}$ represents a value (V) of an electrical signal corresponding to a pin 33 in the second PCB connector;

the third PCB connector:

$$\begin{cases} V_1^{voltage} = V_{PCB3}^{P1} \\ V_2^{voltage} = V_{PCB3}^{P2} \\ \quad \cdots \\ V_{26}^{voltage} = V_{PCB3}^{P31} \\ V_{27}^{voltage} = V_{PCB3}^{P32} \end{cases} ;$$

$V_1^{voltage}$ represents a value (V) of a voltage signal line of the chip resistor 1, $V_{PCB3}^{P1}$ represents an electric signal value (V) corresponding to the pin 1 in the third PCB connector, $V_2^{voltage}$ represents a value (V) of a voltage signal line of the chip resistor 2, $V_{PCB3}^{P2}$ represents an electric signal value (V) corresponding to the pin 2 in the third PCB connector, $V_{26}^{voltage}$ represents a value (V) of a voltage signal line of the chip resistor 26, $V_{PCB3}^{P31}$ represents an electric signal value (V) corresponding to the pin 31 in the third PCB connector, $V_{27}^{voltage}$ represents a value (V) of a voltage signal line of the chip resistor 27, and $V_{PCB3}^{P32}$ represents an electric signal value (V) corresponding to the pin 32 in the third PCB connector.

2. The apparatus for transmitting current and voltage signals of a fuel cell based on connector according to claim 1, wherein,
the first PCB connector and the second PCB connector transmit the current signals in different regions on the membrane electrode assembly inside the fuel cell;
the third PCB connector transmits the voltage signals in different regions on the membrane electrode assembly inside the fuel cell.

3. The apparatus for transmitting current and voltage signals of a fuel cell based on connector according to claim 1, wherein,
there are a current collection array and a voltage collection array in different regions on the membrane electrode assembly inside the fuel cell;
the current collection array collects current signals in different regions on the membrane electrode assembly inside the fuel cell;
the voltage collection array collects voltage signals in different regions on the membrane electrode assembly inside the fuel cell.

4. The apparatus for transmitting current and voltage signals of a fuel cell based on connector according to claim 1, wherein,
the PCB connectors are connected to the data collection module, and specifically comprising:
a female of each of the PCB connectors is connected to a male of a standard harness, and a female of the standard harness is connected to the data collection module.

5. The apparatus for transmitting current and voltage signals of a fuel cell based on connector according to claim 1, wherein,
the chip resistors on the printed circuit board are arranged in an array form;
signals of the pins on the first PCB connector and signals of the pins on the second PCB connector correspond to an arrangement order of current collection arrays in different regions on the membrane electrode assembly inside the fuel cell;
signals of the pins of the third PCB connector correspond to arrangement order of voltage collection arrays in different regions on the membrane electrode assembly inside the fuel cell.

6. The apparatus for transmitting current and voltage signals of a fuel cell based on connector according to claim 1, wherein,
the PCB connectors are soldered to the printed circuit board, specifically including:
an end of each of the PCB connectors is provided with a harpoon, and the printed circuit board is provided with a through hole;
the harpoon at the end of each of the PCB connectors and the through hole on the printed circuit board are fixed by soldering.

7. A method for transmitting current and voltage signals of a fuel cell based on connector, the method being used in the apparatus for transmitting current and voltage signals of a fuel cell based on connector according to claim 1, comprising:
the printed circuit board sends the collected current signals in different regions on the membrane electrode assembly inside the fuel cell to the first PCB connector and the second PCB connector through left current signal lines and right current signal lines;
the printed circuit board sends the collected voltage signals in different regions on the membrane electrode assembly inside the fuel cell to the third PCB connector through voltage signal lines;
a female of each of the PCB connectors is connected to a male of the standard harness, and a female of the standard harness is connected to the data collection module, so as to transmit the current signals and the voltage signals to the data collection module;
the data collection module identifies the current signals and the voltage signals of the PCB connectors, then positions a local current density of the fuel cell represented by each signal according to a position matching relationship, and finally obtains a current density distribution in a whole fuel cell plane.

* * * * *